United States Patent
Lunttila et al.

(10) Patent No.: US 11,303,403 B2
(45) Date of Patent: Apr. 12, 2022

(54) SIGNALING ARRANGEMENT FOR WIRELESS SYSTEM

(71) Applicant: NOKIA TECHNOLOGIES OY, Espoo (FI)

(72) Inventors: Timo Lunttila, Espoo (FI); Klaus Hugl, Vienna (AT); Esa Tiirola, Kempele (FI); Kari Hooli, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/451,613

(22) Filed: Aug. 5, 2014

(65) Prior Publication Data

US 2016/0043841 A1  Feb. 11, 2016

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0053* (2013.01); *H04L 5/0092* (2013.01);
(Continued)

(58) Field of Classification Search
CPC ... H04L 5/0048; H04L 5/0053; H04L 5/0092; H04L 5/0098; H04L 27/26; H04L 5/0055;
(Continued)

(56) References Cited

U.S. PATENT DOCUMENTS 6,167,270 A * 12/2000 Rezaiifar ............. H04B 7/2656
                                                         455/442
9,749,937 B2 * 8/2017 Kim .................... H04L 41/0859
(Continued)

FOREIGN PATENT DOCUMENTS

AU    2011214972 A1    9/2012
CN    105531958 A      4/2016
(Continued)

OTHER PUBLICATIONS

"Broadband Radio Access Networks (BRAN); 5 GHz high performance RLAN; Harmonized EN covering the essential requirements of article 3.2 of the R&TTE Directive", ETSI EN 301 893 V1.7.1, Jun. 2012.*

(Continued)

*Primary Examiner* — Jenee Holland
(74) *Attorney, Agent, or Firm* — Squire Patton Boggs (US) LLP (57) ABSTRACT

Systems, methods, apparatuses, and computer program products for a signaling arrangement for a wireless system are provided. One method includes transmitting a short control signaling (SCS) message to one or more user equipment (UE). The SCS message may comprise at least a reference signal part and an optional control signal part. The reference signal part may comprise reference signals that allow the UE to perform at least one of: cell search, synchronization, fine time/frequency tracking, radio resource management (RRM) measurements, radio link monitoring, or channel state information (CSI) reporting. In an embodiment, the control signal part may indicate at least one of: whether the cell is ON or OFF, whether each subframe in a current or upcoming set of subframes are ON or OFF, TDD uplink-downlink configuration for a current or upcoming radio frame, PLMN ID to identify to which operator's network the cell belongs to, and/or system information.

29 Claims, 7 Drawing Sheets

(51) Int. Cl.
  *H04W 24/08* (2009.01)
  *H04W 72/04* (2009.01)
  *H04W 76/11* (2018.01)
  *H04L 5/14* (2006.01)
  *H04W 48/12* (2009.01)

(52) U.S. Cl.
  CPC ............ *H04L 5/0098* (2013.01); *H04L 27/26* (2013.01); *H04W 24/08* (2013.01); *H04W 72/042* (2013.01); *H04W 76/11* (2018.02); *H04L 5/14* (2013.01); *H04W 48/12* (2013.01)

(58) Field of Classification Search
  CPC . H04L 5/0057; H04L 5/0058; H04L 27/2601; H04W 24/08; H04W 72/042; H04W 76/021; H04W 72/0406
  See application file for complete search history.

(56) References Cited

U.S. PATENT DOCUMENTS

| | | | |
|---|---|---|---|
| 2002/0080820 A1* | 6/2002 | Hashem | H04W 48/12 370/471 |
| 2003/0211860 A1* | 11/2003 | Sarkkinen | H04W 72/005 455/522 |
| 2007/0237117 A1* | 10/2007 | Moon | H04W 74/0866 370/335 |
| 2009/0086671 A1* | 4/2009 | Pelletier | H04W 76/27 370/329 |
| 2009/0088175 A1* | 4/2009 | Pelletier | H04W 72/044 455/450 |
| 2011/0103351 A1* | 5/2011 | Wang | H04W 28/065 370/335 |
| 2011/0176581 A1* | 7/2011 | Thomas | H04B 1/7075 375/146 |
| 2011/0223903 A1* | 9/2011 | Michel | H04B 7/2125 455/422.1 |
| 2011/0249611 A1* | 10/2011 | Khandekar | H04B 7/155 370/315 |
| 2011/0268101 A1* | 11/2011 | Wang | H04L 5/0053 370/344 |
| 2011/0319025 A1* | 12/2011 | Siomina | H04L 5/0032 455/63.1 |
| 2012/0015657 A1* | 1/2012 | Comsa | H04L 5/0048 455/436 |
| 2012/0041966 A1* | 2/2012 | Kamali | H04M 1/72522 707/758 |
| 2012/0046056 A1* | 2/2012 | Luo | H04J 11/005 455/502 |
| 2012/0140714 A1* | 6/2012 | Koskela | H04W 56/00 370/329 |
| 2013/0028199 A1* | 1/2013 | Song | H04W 16/12 370/329 |
| 2013/0058234 A1* | 3/2013 | Yang | H04L 27/261 370/252 |
| 2013/0114435 A1* | 5/2013 | Wang | H04W 48/16 370/252 |
| 2013/0114498 A1* | 5/2013 | Park | H04W 4/06 370/312 |
| 2013/0142062 A1* | 6/2013 | Dinan | H04W 24/00 370/252 |
| 2013/0163543 A1* | 6/2013 | Freda | H04L 5/0041 370/329 |
| 2013/0242921 A1* | 9/2013 | Kim | H04B 7/024 370/329 |
| 2013/0258973 A1* | 10/2013 | Khoshnevis | H04L 5/0064 370/329 |
| 2013/0301561 A1* | 11/2013 | Sartori | H04L 5/0053 370/329 |
| 2013/0315157 A1* | 11/2013 | Krishnamurthy | H04L 5/0053 370/329 |
| 2014/0018072 A1* | 1/2014 | Wei | H04W 48/16 455/434 |
| 2014/0056188 A1 | 2/2014 | Yang et al. | |
| 2014/0064135 A1* | 3/2014 | Chen | H04L 1/0046 370/253 |
| 2014/0341018 A1* | 11/2014 | Bhushan | H04W 28/0289 370/230 |
| 2015/0049741 A1* | 2/2015 | Chen | H04W 48/12 370/336 |
| 2015/0085793 A1* | 3/2015 | Luo | H04L 5/0048 370/329 |
| 2015/0092655 A1* | 4/2015 | Liao | H04J 11/0079 370/312 |
| 2015/0098369 A1* | 4/2015 | Song | H04L 5/005 370/280 |
| 2015/0117345 A1* | 4/2015 | Kim | H04L 5/005 370/329 |
| 2015/0131536 A1 | 5/2015 | Kaur et al. | |
| 2015/0139113 A1* | 5/2015 | You | H04L 5/003 370/329 |
| 2015/0139207 A1* | 5/2015 | Seok | H04W 48/16 370/338 |
| 2015/0201346 A1* | 7/2015 | Wu | H04L 5/0048 370/252 |
| 2015/0249972 A1 | 9/2015 | You et al. | |
| 2015/0282131 A1 | 10/2015 | Nagata et al. | |
| 2015/0282157 A1* | 10/2015 | Kim | H04W 48/14 370/329 |
| 2015/0358899 A1 | 12/2015 | Ko et al. | |
| 2016/0037405 A1* | 2/2016 | Choi | H04W 16/32 455/444 |
| 2016/0037560 A1* | 2/2016 | Liu | H04L 51/34 370/329 |
| 2016/0219614 A1* | 7/2016 | Webb | H04W 48/16 |
| 2016/0262157 A1* | 9/2016 | Kim | H04L 5/0007 |
| 2017/0005775 A1* | 1/2017 | Cheng | H04L 5/0098 |
| 2017/0013515 A1* | 1/2017 | Bangolae | H04W 76/068 |
| 2017/0195889 A1 | 7/2017 | Takeda et al. | |

FOREIGN PATENT DOCUMENTS

| | | |
|---|---|---|
| CN | 106538013 A | 3/2017 |
| JP | 2013-534395 A | 9/2013 |
| JP | 2014-500685 A | 1/2014 |
| KR | 20140095994 A | 8/2014 |
| WO | 2011/136266 A1 | 11/2011 |
| WO | 2014/061345 A1 | 4/2014 |
| WO | 2014061345 A1 | 4/2014 |
| WO | 2014098444 A1 | 6/2014 |
| WO | 2015169397 A1 | 11/2015 |
| WO | 2016/006449 A1 | 1/2016 |

OTHER PUBLICATIONS

Harmonized European Standard, ETSI EN 301 893 V 1.7.1 (Jun. 2012) (Year: 2012).*
"Review Of Regulatory Requirements For Unlicensed Spectrum", 3GPP TSG-RAN #63, RP-140054, Agenda item: 14.2, Mar. 3-6, 2014, pp. 1-16.
"Broadband Radio Access Networks (BRAN); 5 GHz High Performance RLAN; Harmonized EN Covering The Essential Requirements Of Article 3.2 Of The R&TTE Directive", Final draft, ETSI EN 301 893, v1.7.0, Jan. 2012, pp. 1-90.
Japanese Office Action and its English Language Translation dated Apr. 16, 2018, issued in corresponding JP Application No. 2017-506275.
"Broadband Radio Access Networks (BRAN); 5 GHz High Performance RLAN; Harmonized EN Covering the Essential requirements of Article 3.2 of the R&TTE Directive", Final draft, (ETSI) EN 301 893, V1.6.0, Jul. 1, 2011. pp. 1-78. XP014065546.
European Search Report dated Feb. 15, 2018, issued in corresponding EP Application No. 15829165.8.
Japanese Office Action and it's English language translation dated Aug. 3, 2018, issued in corresponding JP Application No. 2017-506275.
"3rd Generation Partnership Project; Technical Specification Group Radio Access Network; Evolved Universal Terrestrial Radio Access (56) References Cited

OTHER PUBLICATIONS (E-UTRA); Physical layer procedures (Release 8)", 3GPP TS 36.213 V8.8.0, Sep. 29, 2009. pp. 1-81.
First Office Action issued in corresponding Indian Patent Application No. 201747007099, dated Jun. 28, 2019, with English translation.
Notice of Reasons for Rejections issued in corresponding Japanese Patent Application No. 2018-231721, dated Aug. 28, 2019.
3rd Generation Partnership Project, Technical Specification Group Radio Access Network; Small cell enhancements for E-UTRA and E-UTRAN Physical layer aspects (Release 12), 3GPP TR 36.872, Dec. 2013.
Communication pursuant to Article 94(3) EPC issued in corresponding European Patent Application No. 15829165.8, dated Sep. 20, 2019.
First Office Action issued in corresponding Chinese Patent Application No. 201580048635.1, dated Sep. 3, 2019, with partial English translation.
Third Office Action issued in corresponding Chinese Patent Application No. 2015800486351 dated Jan. 29, 2021, with English summary thereof.
Extended European Search Report issued in corresponding European Patent No. 21160809 dated Apr. 9, 2021.
First Office Action issued in corresponding Japanese Patent Application No. 2020-085269 dated Apr. 28, 2021, with English summary thereof.
Decision of Final Rejection issued in corresponding Japanese Patent Application No. 2020-085269 dated Oct. 22, 2021, with English summary thereof.
Second Chinese Office Action issued in corresponding Chinese Patent Application No. 2015800486351, dated May 15, 2020, with English translation thereof.
European Office Action application No. 15 829 165.8 dated Oct. 22, 2018.
Japanese Final Office Action issued in corresponding Japanese Patent Application No. 2018-213721, dated Jan. 7, 2020, with English translation thereof.

\* cited by examiner

SIGNALING ARRANGEMENT FOR WIRELESS SYSTEM

FIELD

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology.

BACKGROUND

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment is directed to a method including transmitting a short control signaling (SCS) message to at least one user equipment (UE). The short control signaling (SCS) message comprises at least a reference signal part and an optional control signal part. The reference signal part and the control signal part may be configured and/or transmitted independently. The reference signal part may comprise reference signals that allow the at least one user equipment (UE) to perform at least one of cell search, synchronization, fine time/frequency tracking, radio resource management (RRM) measurements, radio link monitoring, or channel state information (CSI) reporting.

Another embodiment is directed to an apparatus including at least one processor and at least one memory including computer program code. The at least one memory and computer program code are configured, with the at least one processor, to cause the apparatus at least to transmit a short control signaling (SCS) message to at least one user equipment (UE). The short control signaling (SCS) message comprises at least a reference signal part and an optional control signal part. The reference signal part and the control signal part may be configured and/or transmitted independently. The reference signal part may comprise reference signals that allow the at least one user equipment (UE) to perform at least one of cell search, synchronization, fine time/frequency tracking, radio resource management (RRM) measurements, radio link monitoring, or channel state information (CSI) reporting.

Another embodiment is directed to a method including receiving, by a user equipment (UE), a short control signaling (SCS) message from a network node. The short control signaling (SCS) message may comprise at least a reference signal part and an optional control signal part. The reference signal part and the control signal part may be configured and/or received independently. The reference signal part may comprise reference signals that allow the user equipment (UE) to perform at least one of cell search, synchronization, fine time/frequency tracking, radio resource management (RRM) measurements, radio link monitoring, or channel state information (CSI) reporting.

Another embodiment is directed to an apparatus including at least one processor and at least one memory including computer program code. The at least one memory and computer program code are configured, with the at least one processor, to cause the apparatus at least to receive a short control signaling (SCS) message from a network node. The short control signaling (SCS) message may comprise at least a reference signal part and an optional control signal part. The reference signal part and the control signal part may be configured and/or received independently. The reference signal part may comprise reference signals that allow the apparatus to perform at least one of cell search, synchronization, fine time/frequency tracking, radio resource management (RRM) measurements, radio link monitoring, or channel state information (CSI) reporting.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for a signaling arrangement for a wireless system, such as LTE, LTE-A, or LTE-unlicensed (LTE-U), as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the invention relate to the LTE-Advanced system and, more specifically, are directed to control signaling arrangements for LTE-Unlicensed (LTE-U), which is also known as Licensed-Assisted Access (LAA). Some embodiments are directed to the transmission format for the signals necessary for the user equipment (UE) or mobile device to maintain synchronization to an LTE-U cell while complying with listen before talk (LBT) requirements.

Figure 1:
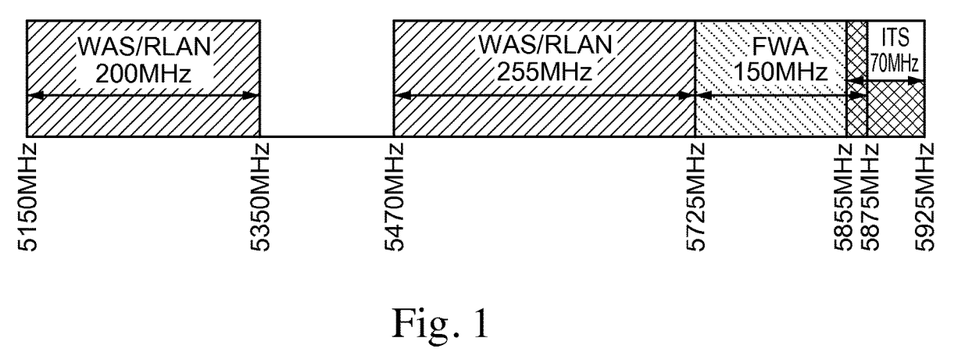
FIG. 1 illustrates an example of the relevant parts of the 5 GHz band set aside for unlicensed spectrum usage.

Embodiments assume LBT procedure based on European regulatory rules defined for 5 GHz industrial, scientific, and medical (ISM) band is supported. FIG. 1 illustrates an example of the relevant parts of the 5 GHz band set aside for unlicensed spectrum usage. However, it should be noted that embodiments are not limited to spectrum allocation in Europe or European regulator rules, and certain embodiments are equally applicable to other jurisdictions.

Some operators consider the objectives of LTE-U work and the messages related to LTE-U to include the following:

Licensed band LTE has better service quality than unlicensed spectrum, which may be shared by different operators (and technologies);

LTE-U is complementary to LTE on licensed band and LTE-U does not impact the need for having more licensed band;

LTE-U should be developed so that it relies on licensed band LTE operations, e.g., using carrier aggregation where primary cell (PCell) is on licensed band.

Furthermore, some operators express the view that LTE-U should support only downlink-only operation (Supplementary Downlink (SDL)). Support for time division duplex (TDD) operation may also be considered.

LTE-U is being considered as a candidate topic for LTE release 13 (Rel-13) at least in part for the following reasons:

LTE on license-exempt bands provides additional spectrum opportunities for operators Wireless data usage is growing exponentially and operators are facing capacity constraint in the networks Available licensed spectrum is limited and can be very costly to obtain WiFi offloading is often listed as a solution for utilization of unlicensed spectrum, but LTE can perform much better than WiFi as the system becomes heavily loaded.

It is generally well understood that unnecessary transmissions on unlicensed carriers need to be kept at minimum level in order to avoid interfering with other devices or access points operating on the same carrier frequency. On the other hand, in order to be able to operate, the UE needs to first synchronize to a cell based on some predefined signals. Considering that the eNodeB (or LTE-U access point) will need to suspend DL transmissions from time to time (i.e., perform on/off switching) to comply with regulatory requirements such as LBT, two alternative ways for UE operation can be identified from the synchronization point of view: (1) Asynchronous on/off operation; and (2) Synchronous on/off operation.

Asynchronous on/off operation assumes that once the cell (i.e., eNB or AP) is turned off, the UE will no longer maintain accurate synchronization due to absence of dense enough reference signals (e.g., cell-specific reference signal (CRS)). Consequently, during the OFF-period the eNodeB may transmit as little as possible (for instance only discovery signals may be transmitted if configured) and hence maximize the energy savings while keeping the interference at a minimum. The drawbacks of this option relate to the time required for re-acquiring synchronization after the cell is moved to the ON state again. There does not appear to be a clear consensus in the 3GPP on what would be the time needed for the UE to regain synchronization, but the first guess estimate can be drawn from the requirements currently in place for secondary cell (SCell) activation in carrier aggregation (CA), which may take up to 34 ms. Additionally, some additional latency due to on/off indication needs to be taken into account as well. This makes asynchronous on/off operation rather impractical in LTE-U scenario, where LBT may need to be performed relatively often to check if channel is available.

Synchronous on/off operation assumes that the UE remains synchronized all the time. For this purpose, reference signals used for time/frequency tracking (e.g., CRS) as well as signals required for synchronization (primary synchronization signal (PSS)/secondary synchronization signal (SSS)) may need to be transmitted reasonable frequently. The findings from new carrier type (NCT) studies indicated that around 5 to 10 millisecond periodicity is required for CRS transmission to accomplish this, which considerably limits the possibilities for eNodeB energy savings/on-off switching and increases interference as the transmitter needs to transmit in 10-20% of all subframes to facilitate synchronization, regardless of whether there is traffic in the cell or not. On the other hand, the on/off transition time is in practice instantaneous and a cell can handle data immediately after its status has been changed to the ON state, and the performance potential of cell on/off switching can be maximized. Considering the LTE-U scenario, synchronous operation has clear merits, as it permits very rapid (1 ms time scale) on/off switching.

In addition to synchronization, regularly transmitted signals also enable cell discovery/detection/identification as well as radio resource management (RRM) type of measurements from a LTE-U cell. Additionally, channel state information (CSI) calculation and reporting as well as radio link monitoring by the UE may be supported.

A problem, however, relates to how to transmit (reference) signals periodically to facilitate at least one of cell discovery/identification, RRM measurements, CSI measurements, radio link monitoring, and UE synchronization while complying with LBT requirements set by the regulators.

Different regions have different regulatory requirements for unlicensed band operation. These are summarized in 3GPP contribution RP-140054 ("Review of Regulatory Requirements for Unlicensed Spectrum"). Despite of the regulatory rules, LTE has not yet been deployed in unlicensed spectrum.

For example, EN 301 893 defines European regulatory requirements for unlicensed band on 5 GHz band. It defines two types of modes of operation: (1) frame based equipment; and (2) load based equipment. Frame based equipment is the equipment where the transmit/receive structure is not directly demand-driven but has fixed timing, and load based equipment is the equipment where the transmit/receive structure is not fixed in time but demand driven. It is assumed, in some embodiments, that frame based equipment may be more suitable for LTE-U operation compared to load based equipment. However, embodiments of the invention may also apply to load based equipment.

Figure 2:
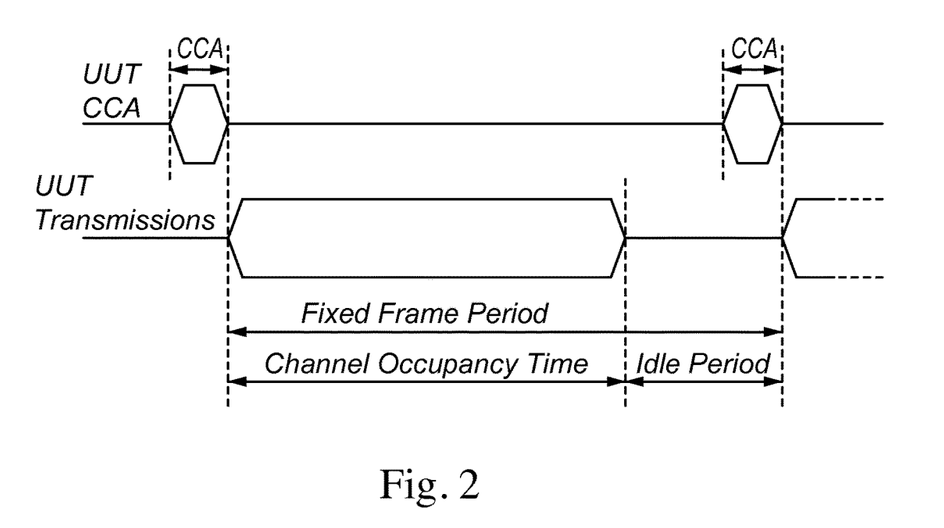
FIG. 2 illustrates an example of the frame based equipment operation under the European regulatory rules.

FIG. 2 illustrates an example of the frame based equipment operation under the European regulatory rules of EN 301 893. In particular, EN 301 893 indicates that frame Based Equipment shall comply with the following requirements:

1) Before starting transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the Operating Channel(s) to be clear, it may transmit immediately (see point 3 below).

2) If the equipment finds an Operating Channel occupied, it shall not transmit on that channel during the next Fixed Frame Period. The equipment is allowed to continue Short Control Signalling Transmissions on this channel providing it complies with the requirements in clause 4.9.2.3 outlined below. For equipment having simultaneous transmissions on multiple (adjacent or non-adjacent) Operating Channels, the equipment is allowed to continue transmissions on other Operating Channels providing the CCA check did not detect any signals on those channels.

3) The total time during which an equipment has transmissions on a given channel without re-evaluating the availability of that channel, is defined as the Channel Occupancy Time. The Channel Occupancy Time shall be in the range 1 ms to 10 ms and the minimum Idle Period shall be at least 5% of the Channel Occupancy Time used by the equipment for the current Fixed Frame Period. Towards the end of the Idle Period, the equipment shall perform a new CCA as described in point 1 above.

4) The equipment, upon correct reception of a packet which was intended for this equipment, can skip CCA and immediately proceed with the transmission of management and control frames (e.g., ACK and Block ACK frames). A consecutive sequence of such transmissions by the equipment, without it performing a new CCA, shall not exceed the Maximum Channel Occupancy Time as defined in point 3 above. For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

The same reference to allowing the equipment to continue transmission of Short Control Signalling is also present in the description of the load based equipment operation in 4.9.2.2 of EN 301 893. Basically, Short Control Signalling messages can be transmitted without sensing the channel or even if the channel has been detected as occupied.

Short Control Signalling (SCS) is defined in EN 301 893 in Section 4.9.2.3 as follows:

4.9.2.3 Short Control Signalling Transmissions 4.9.2.3.1 Definition

Short Control Signalling Transmissions are transmissions used by Adaptive equipment to send management and control frames (e.g. ACK/NACK signals) without sensing the channel for the presence of other signals.

NOTE: Adaptive equipment may or may not have Short Control Signalling Transmissions.

4.9.2.3.2 Limits

If implemented, Short Control Signalling Transmissions of Adaptive equipment shall have a maximum duty cycle of 5% within an observation period of 50 ms.

Therefore, embodiments of the invention provide a framework for utilizing SCS in LTE-U. In particular, certain embodiments define a Short Control Signal (SCS) structure for LTE-U such that the UE can do at least one of (a) discover the LTE-U cells, (b) perform RRM measurements, (c) perform CSI measurements or (d) maintain synchronization to the LTE-U cell all the time (or whenever configured to do so), and that the eNodeB does not violate LBT requirements set by regulators. In example embodiments, the SCS is divided into two parts, which may be configured and/or transmitted separately.

In an embodiment, the first part of SCS is a Reference signal part. The Reference signal part of SCS comprises reference signals allowing for the UE to perform, for example, cell search, synchronization, fine time/frequency tracking, RRM measurements, radio link monitoring, and/or CSI reporting. In certain embodiments, these reference signals include the signals present in discovery signals, i.e., PSS/SSS/CRS and possibly CSI-RS. In one example embodiment, the Reference signal part of SCS may be based on the LTE Rel. 12 Discovery signal.

The second part of SCS is a Control signal part. The Control signal part can be transmitted without CCA procedure. Hence, it allows for maintaining continuous DL control connection in LTE-U cell regardless of the outcome of eNB's CCA. The control signal part of SCS may indicate one or more of the following properties:

1. Whether the LTE-U cell is ON or OFF:
   In other words, whether the UE can assume that reference signals and common physical channels are transmitted in the subsequent subframes or not.
   In one embodiment, this is equivalent to indicating whether the CCA has been successful or not.
2. Whether each of the subframes in the present or an upcoming set of subframes (e.g., radio frame or half of the radio frame) are ON or OFF:
   In other words, in which of the subsequent subframes the UE can assume that reference signals and common physical channels are transmitted in or not.
3. TDD UL-DL configuration for the present or an upcoming radio frame.
4. Public land mobile network identifier (PLMN ID) to identify to which operator's network the LTE-U cell belongs to.
5. Carrier domain-related information:
   This includes, for example, information usually carried in LTE by physical broadcast channel (PBCH) or within system information blocks (SIBs), i.e., system information.

The Control signal part of SCS may be transmitted using physical downlink control channel (PDCCH) format. In an example embodiment, the control signal part of SCS comprises one or more downlink control information (DCI) messages. The size of these DCI messages may be aligned with the size of an existing DCI message such as DCI format 1C and/or 0/1A. In an example embodiment, the control signal part may be transmitted in the same orthogonal frequency division multiplexing (OFDM) symbol(s) as used also by some of the reference signal part in order to keep the channel occupancy as low as possible, for example, in the 1st OFDM symbol of PDCCH. In one embodiment, a specific PDCCH search space may be defined for SCS control signal part. According to an embodiment, the cyclic redundancy check (CRC) of the control signal part may be scrambled with a specific radio network temporary identifier (RNTI).

The presence of the control signal part of SCS may depend on the eNB's scheduling decision and therefore its presence may be optional. For example, in a case where the UE does not detect control signal part of SCS, it may assume that the following subframes are not utilized for data communication and do not contain signals other than SCS. In some embodiments, certain carrier domain-related information including, for example, the PLMN ID does not necessarily need to be transmitted with the same periodicity as the reference signal part, but only be present in any other periodic transmission occasion of the reference signal part.

A third property of SCS periodic transmission may include, in an example embodiment, a preferred periodicity of 5, 10 ms, or 20 ms, for instance. In one embodiment, SCS may be transmitted in the subframe #0 and/or subframe #5 of a radio frame. In another embodiment, SCS may occur at the beginning of channel reservation window (CRW). CRW can be considered to include the resources (e.g., subframes) that the network may reserve/utilize until it needs to perform LBT again.

Figure 3:
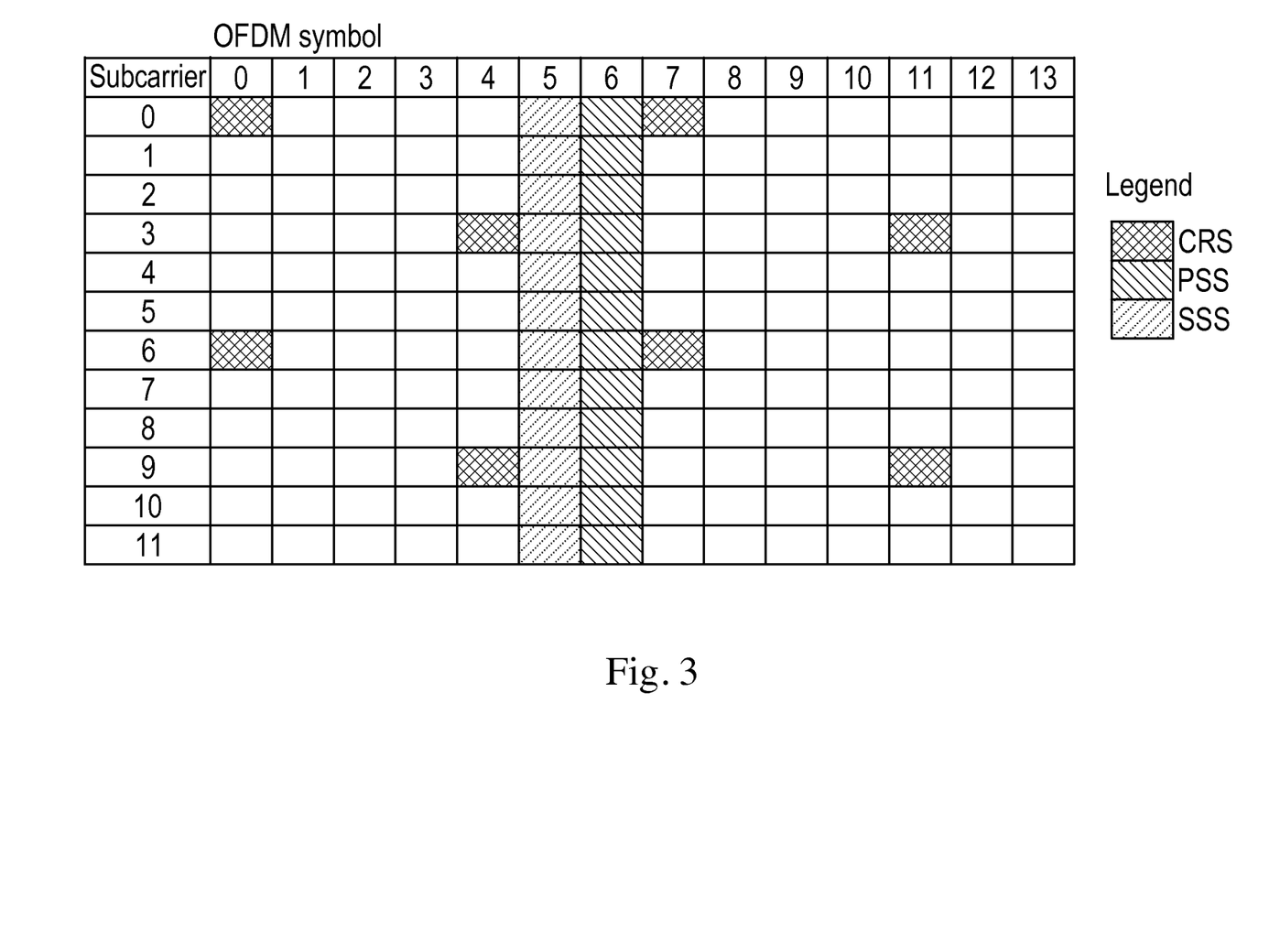
FIG. 3 illustrates an example of FDD structure of LTE, according to an embodiment.
Figure 4:
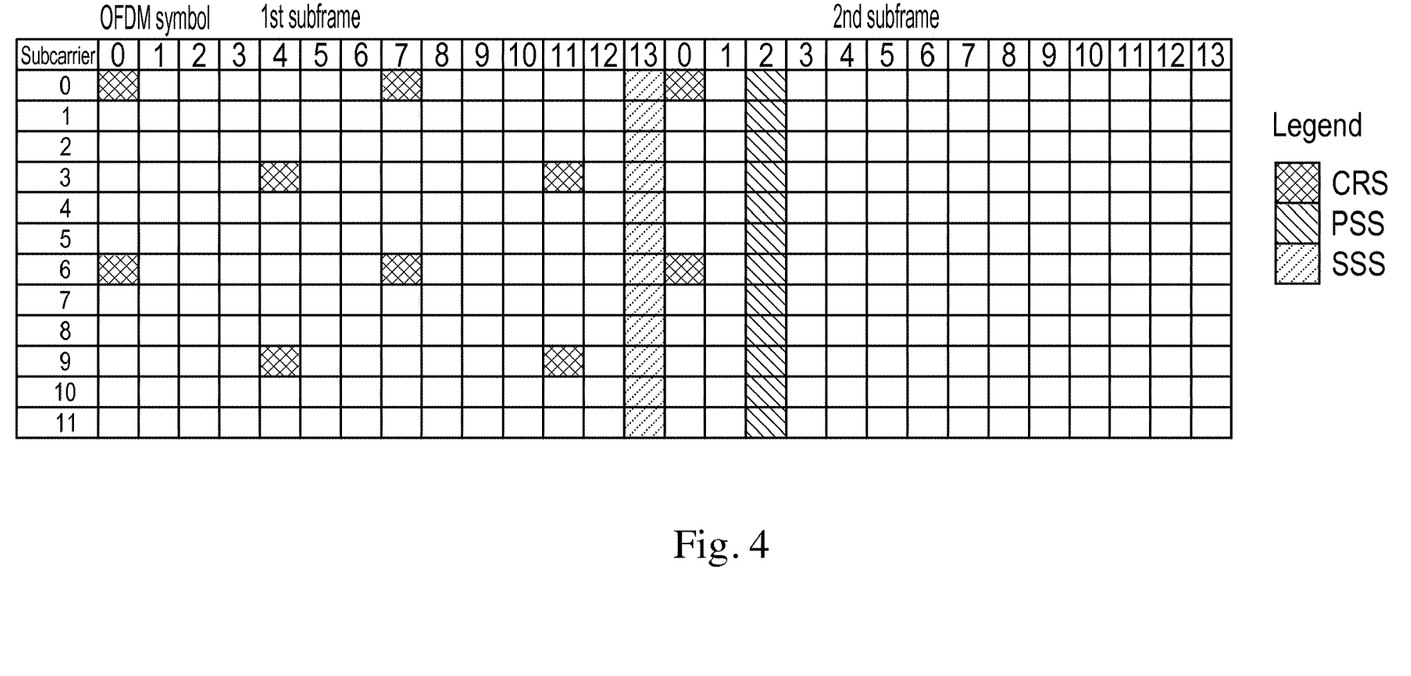
FIG. 4 an example of TDD structure, according to an embodiment.
Figure 5A:
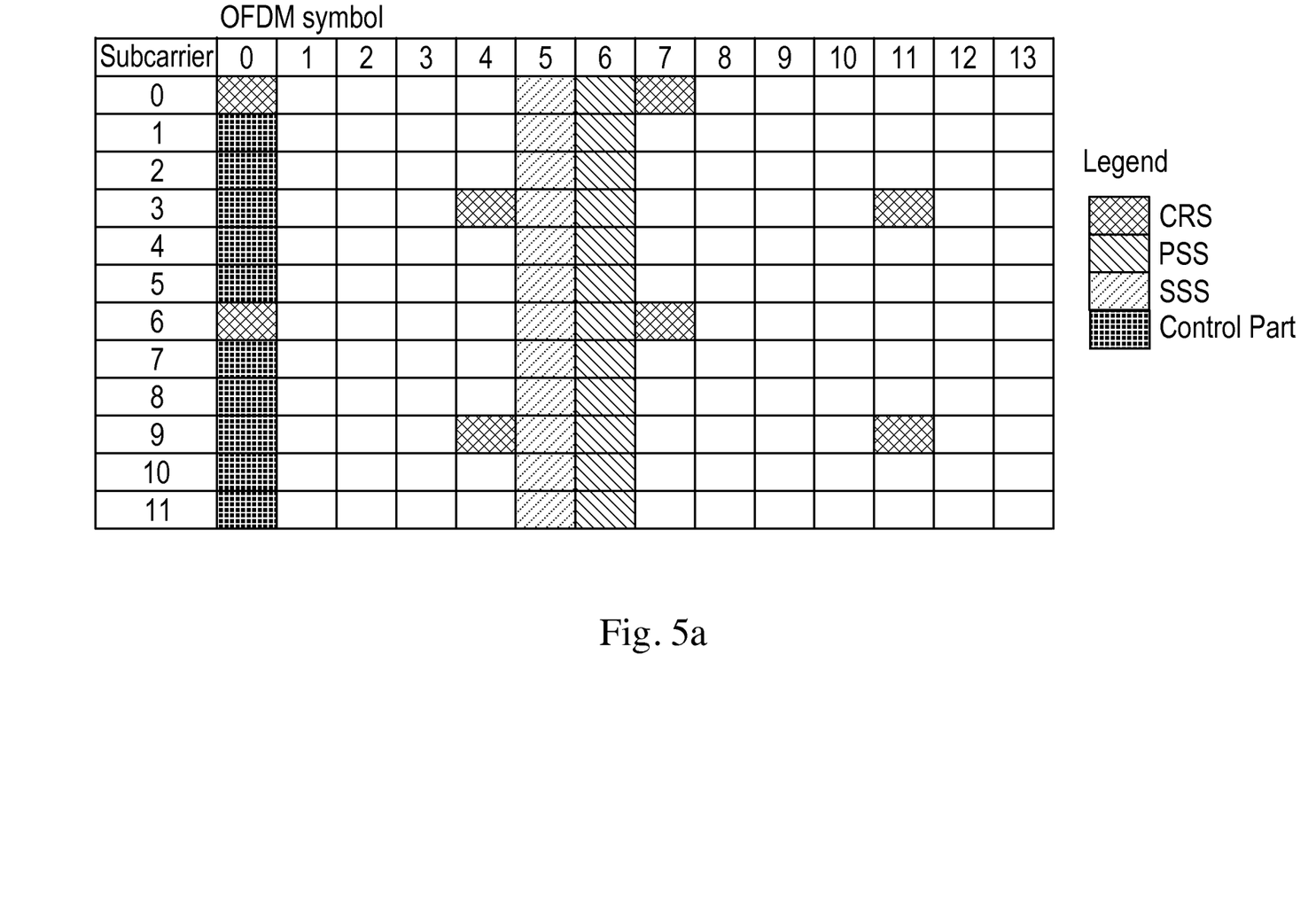
FIG. 5a illustrates an example of SCS including the Control signaling part, according to an embodiment.
Figure 5B:
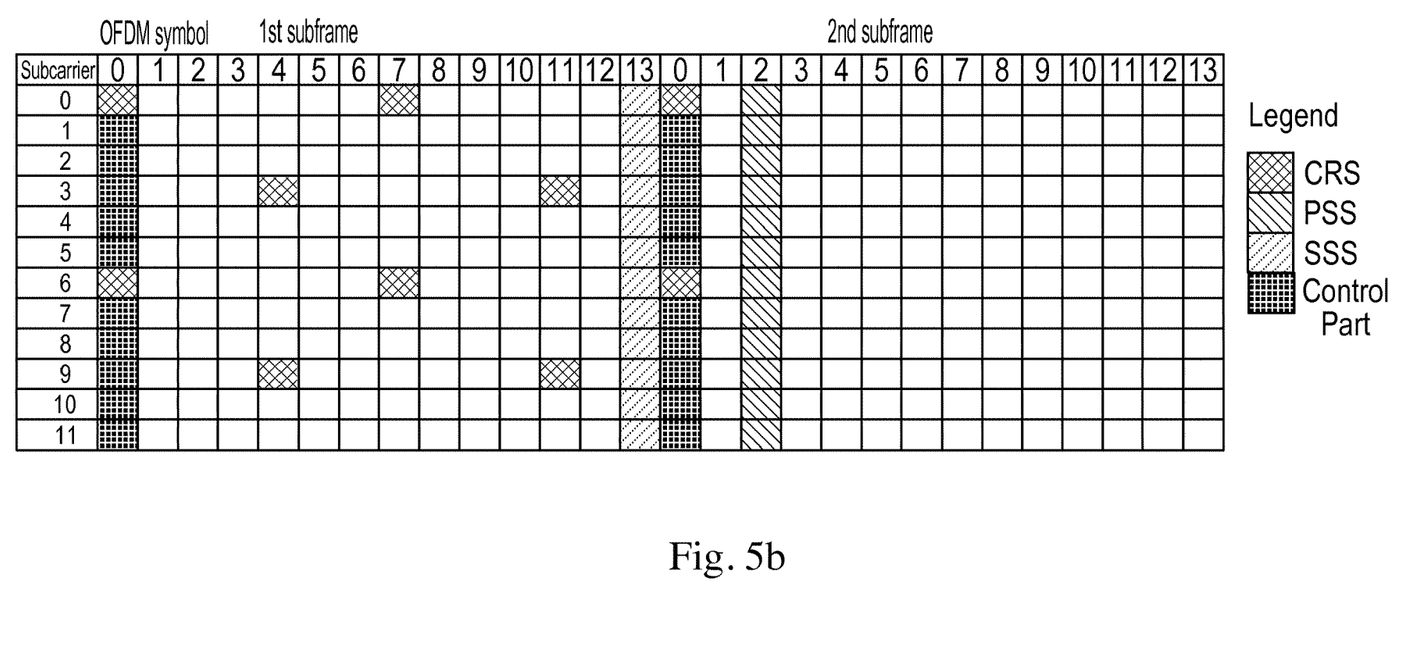
FIG. 5b illustrates an example of SCS including the Control signaling part, according to an embodiment.

FIGS. 3-5 discussed below illustrate some examples of SCS, which may include a reference signal and possibly a control part. As discussed above, in one embodiment, the reference signal part may be based on 3GPP Rel-12 discovery signal design. The example of FIG. 3 illustrates the case of FDD structure of LTE containing PSS/SSS/CRS in a single subframe (e.g., #0 only).

In the case of TDD structure, as illustrated in the example of FIG. 4, the reference signal part may look slightly different since PSS and SSS are located in different subframes.

FIGS. 5a and 5b illustrate examples of SCS with the Control signaling part included. As depicted in the examples of FIGS. 5a and 5b, mapping the control signal part to the 1st OFDM symbol (i.e., symbol #0) may be beneficial in terms of minimizing the time instances when the LTE-U cell is transmitting.

According to an example embodiment, the SCS format may remain unchanged regardless of the CCA/LBT result of the eNB. In this embodiment, this would mean that resource elements occupied by SCS are not used by other signals (or purposes).

In an embodiment, there is a connection between SCS and the applied frame format. All UEs can be made aware of the SCS configuration in the cell. SCS may be designed such that at the SCS time instants (in a given cell), eNB is in Tx phase and all UEs are in Rx phase. In an example embodiment, when operating in LTE-U cell, it is not possible for any UE to transmit during SCS time instant at the LTE-U carrier.

When defining the SCS structure, the number of OFDMA symbols carrying SCS can be minimized. The portion of symbols containing SCS is smaller than or equal to a predefined portion (e.g., 5%) when measured over a predefined period (e.g., 50 ms). Hence, the control part of SCS is preferably transmitted on symbols carrying also the reference signal part (see FIG. 5 above).

Embodiments may include conveying information about the (semi-static) ON/OFF state of the cell. In the OFF state, the LTE-U cell will not even try to serve any user. Thus, only the SCS is transmitted from the LTE-U cell and the eNB does not even try to perform any CCA. In the OFF state, the UE will assume no other signals present from the LTE-U cell than those contained in the SCS part. Therefore, the UE will neither try to (blind) decode any (E)PDCCH or expect any PDSCH, and does not even need to create baseband samples of the LTE-U carrier other than those containing the periodical SCS.

In the ON state, the LTE-U cell may try to serve a user. Thus, depending on the LBT result during the CCA period, the eNB will be able to transmit or suspend transmission if the channel is regarded as being occupied. In the ON state, the UE behavior may be dependent on if additional signaling of the channel availability/LTE-U cell transmission is additionally contained in the SCS control part or not. If separate signaling is present, the UE is aware if the LTE-U cell can transmit during the upcoming subframes or not (depending on the CCA result). If no separate signaling/indication is present, the UE will not be aware if the channel is regarded as available for transmission at the LTE-U cell eNB. Therefore, the UE will create the relevant post-FFT baseband samples and will try to blindly decode (E)PDCCH on the LTE-U carrier assuming the relevant reference signals for demodulation to be present. Moreover, the UE is required to store the BB samples for PDSCH decoding in case PDSCH allocation is present based on control information contained on the LTE-U cells (E)PDCCH or through cross-carrier scheduling of some legacy, licensed band carrier.

Embodiments may include conveying information about the eNB transmitting in/using the present or an upcoming set of subframes. In an embodiment, the control part of the SCS can be used to convey information about whether the eNB will (be able to) transmit in the present or an upcoming set of subframes and consequently, whether the UE will need to monitor the cell for possible data and control signal transmission in this set of subframes. This can be considered as a way to broadcast the eNB's CCA result in the cell. This type of dynamic signaling of the channel availability/utilization is only feasible in case that the (configured) channel reservation window length is longer or equal to the shortest supported/allowed SCS periodicity.

In an embodiment, the "ON" subframes are characterized as having the CRS present in every subframe (Alternatively, it is possible to define that CRS may be present during those subframes). These can be used to measure CSI at the UE side (valid PDCCH can aid CSI measurements). According to one embodiment, the UE is expected to decode (E)PDCCH during those "ON" subframes.

In an embodiment, the "OFF" subframes are characterized as having no other signals or channels than possibly SCS present. In this embodiment, CSI is not measured during those "OFF" subframes. The UE is not expected to decode (E)PDCCH during those "OFF" subframes. "OFF" subframes may be configured in the case when the outcome of eNB's CCA is negative.

In certain embodiments, two timing options are identified for the control part of the SCS. In one option, if the SCS control part indicates the CCA results, the SCS control part may be transmitted in the first subframe of the same channel reservation window.

In a second option, periodicity of related SCS can be made configurable. That would allow for reducing the periodicity and provide reasonable SCS processing time for the UE (that would make related SCS quite similar to current UL-DL reconfiguration indicator in eIMTA). In this case, SCS control part can convey static or semi-static information like PLMN ID, carrier domain information or other static system information, or information about the semi-static ON/OFF state of the cell. This option is relevant especially in the cases where CRW length is shorter than the shortest supported/allowed SCS periodicity, or CRW cannot be time-aligned with SCS control part transmissions.

Figure 6A:
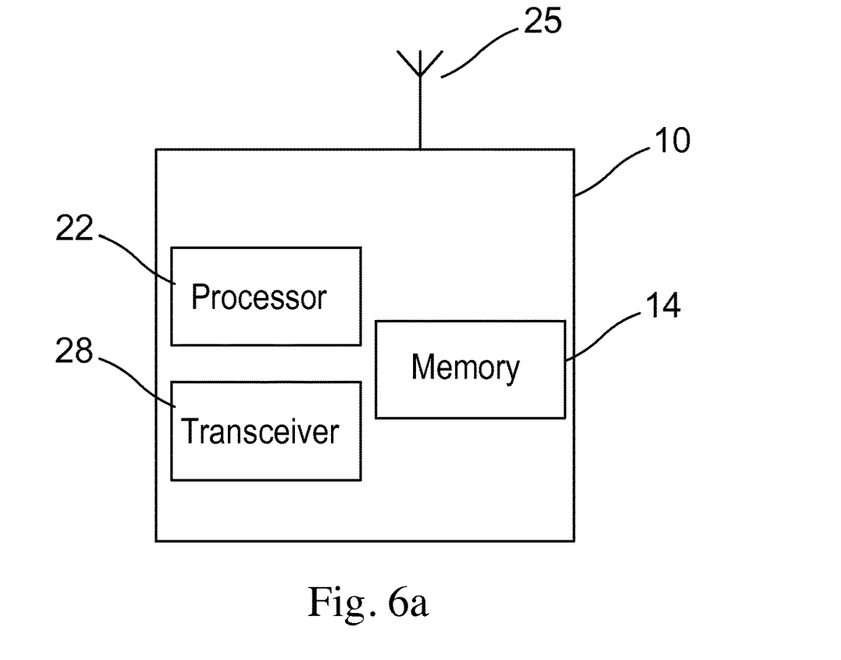
FIG. 6a illustrates a block diagram of an apparatus, according to an embodiment.

FIG. 6a illustrates an example of an apparatus 10 according to an embodiment. In an embodiment, apparatus 10 may be a node, host, or server in a communications network or serving such a network, such as an access point, base station, or eNB in LTE. It should be noted that one of ordinary skill in the art would understand that apparatus 10 may include components or features not shown in FIG. 6a.

As illustrated in FIG. 6a, apparatus 10 includes a processor 22 for processing information and executing instructions or operations. Processor 22 may be any type of general or specific purpose processor. While a single processor 22 is shown in FIG. 6a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to an embodiment, apparatus 10 may be an access point, base station, or eNB, for example. In this embodiment, apparatus 10 may be controlled by memory 14 and processor 22 to define a SCS structure for a wireless system, such as LTE-U, where the structure comprises a reference signal part and optionally includes a control signal part. In one embodiment, apparatus 10 may be controlled by memory 14 and processor 22 to transmit a SCS message to one or more UEs in a wireless system (e.g., LTE-U), where the SCS message comprises the reference signal part and optionally may include the control signal part. In certain embodiments, the reference signal part and the control signal part may be configured and/or transmitted independently. According to an embodiment, the reference signal part comprises reference signals that allow the UE to perform one or more of the following: cell search, synchronization, fine time/frequency tracking, radio resource management (RRM) measurements, radio link monitoring, and/or channel state information (CSI) reporting.

In an embodiment, the reference signal part may comprise signals present in discovery signals including, for example, PSS/SSS/CRS and/or CSI-RS. In another embodiment, the reference signal part may be based on the LTE Rel-12 discovery signal.

According to some embodiments, the control signal part may be transmitted without a Clear Channel Assessment (CCA) procedure. In addition, in an embodiment, the control signal part indicates one or more of the following: whether the LTE-U cell is ON or OFF, whether each subframe in a current or upcoming set of subframes are ON or OFF, time division duplex (TDD) uplink-downlink configuration for a current or upcoming radio frame, public land mobile network identifier (PLMN ID) to identify to which operator's network the LTE-U cell belongs to, and/or carrier domain-related information.

In certain embodiments, the control signal part may be transmitted using the physical downlink control channel (PDCCH) format. Also, in some embodiments, the control signal part comprises one or more downlink control information (DCI) message(s). According to an embodiment, the control signal part may be transmitted in a same orthogonal frequency division multiplexing (OFDM) symbol(s) as also used by a portion of the reference signal part.

According to an embodiment, apparatus 10 may be controlled by memory 14 and processor 22 to define a specific physical downlink control channel (PDCCH) search space for the control signal part. In one embodiment, apparatus 10 may be controlled by memory 14 and processor 22 to scramble a cyclic redundancy check (CRC) of the control signal part with a radio network temporary identifier (RNTI).

In some embodiments, the SCS message may be transmitted with a periodicity of 5, 10, 15, 20, 40, 80, or 160 milliseconds, for example. For instance, in an embodiment, the SCS message may be transmitted in at least one of subframe #0 or subframe #5 of a radio frame. According to another embodiment, the SCS message may be transmitted at a beginning of a channel reservation window (CRW). According to an embodiment, the timing of SCS message or CRW may depend on the timing of another cell not applying a Clear Channel Assessment (CCA) or listening-before-talk (LBT) procedure and/or transmitted on licensed spectrum. According to an embodiment, the UE may receive information on transmission timing relation between SCS message or CRW and timing of another cell not applying a Clear Channel Assessment (CCA) or listening-before-talk (LBT) procedure and/or transmitted on licensed spectrum. Timing relation information may contain, for example, frame or subframe offset, and/or cell timing may be determined as timing of radio frame.

In one embodiment, at least part of SCS message configuration may be signaled to at least one UE via another cell not applying a Clear Channel Assessment (CCA) or listening-before-talk (LBT) procedure and/or transmitted on licensed spectrum. SCS message configuration may comprise at least one value for at least one of SCS periodicity, RNTI used to scramble the CRC of the control signal part, presence of control signal part, presence of control signal part, presence of certain information fields or indications in control signal part.

In another embodiment, the UE is configured in carrier aggregation comprising at least a first cell and a second cell, wherein a Clear Channel Assessment (CCA) or listening-before-talk (LBT) procedure is not applied on the first cell, and the UE receives signaling of SCS message configuration via the first cell and uses the SCS message configuration to receive SCS message on the second cell.

Figure 6B:
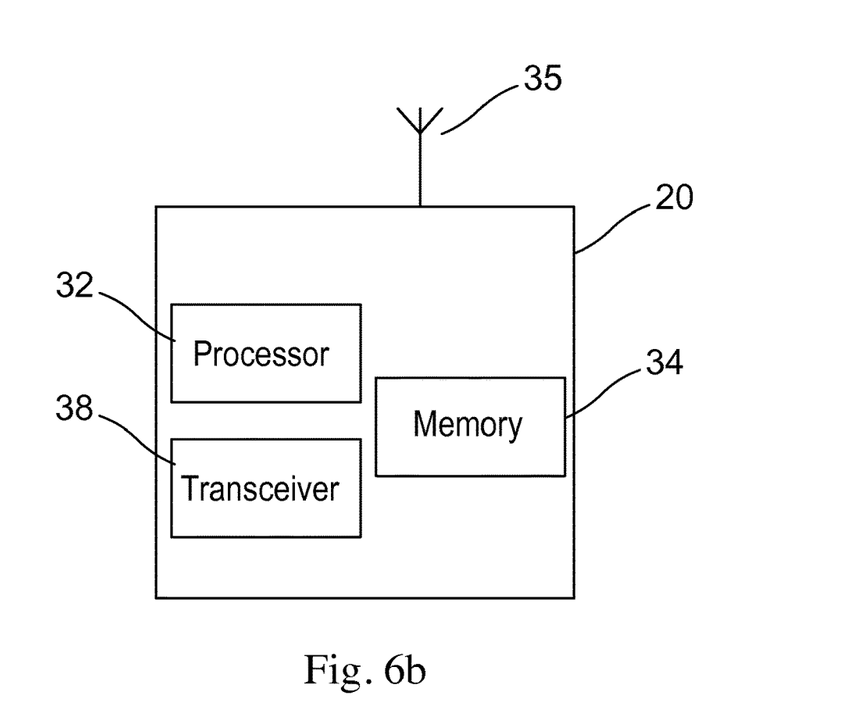
FIG. 6b illustrates a block diagram of an apparatus, according to another embodiment.

FIG. 6b illustrates an example of an apparatus 20 according to another embodiment. In an embodiment, apparatus 20 may be a mobile station or device associated with a communications network, such as UE in LTE. It should be noted that one of ordinary skill in the art would understand that apparatus 20 may include components or features not shown in FIG. 6b. Only those components or features necessary for illustration of the invention are depicted in FIG. 6b.

As illustrated in FIG. 6b, apparatus 20 includes a processor 32 for processing information and executing instructions or operations. Processor 32 may be any type of general or specific purpose processor. While a single processor 32 is shown in FIG. 6b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile station or device in or associated with a communications network, such as a UE in LTE. In this embodiment, apparatus 20 may be controlled by memory 34 and processor 32 to receive a short control signaling (SCS) message from an eNB in a wireless system (e.g., LTE-U), for example. The SCS message may comprise at least a reference signal part and an optional control signal part. In an embodiment, the reference signal part and the control signal part may be configured and/or received independently. The reference signal part may comprise reference signals that allow the apparatus to perform, for instance, cell search, synchronization, fine time/frequency tracking, radio resource management (RRM) measurements, radio link monitoring, and/or channel state information (CSI) reporting. In one embodiment, when the SCS message does not comprise the control signal part, apparatus 20 may be controlled by memory 34 and processor 32 to determine cell-specific information potentially including whether one or more of the upcoming subframes are not used for data communication.

Figure 7A:
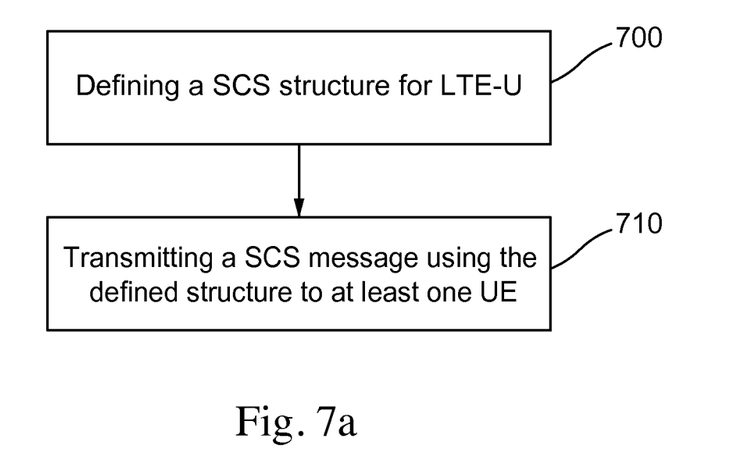
FIG. 7a illustrates a flow diagram of a method, according to an embodiment.

FIG. 7a illustrates an example of a flow diagram of a method, according to an embodiment. In one embodiment, the method may be performed by a base station or eNB, for example. The method includes, at 700, defining a SCS structure for LTE-U, where the SCS structure comprises a reference signal part and optionally includes a control signal part. In one embodiment, the method may further include, at 710, transmitting a SCS message to one or more UEs in a wireless system (e.g., LTE-U), where the SCS message comprises the reference signal part and optionally may include the control signal part. In certain embodiments, the transmitting may include configuring and transmitting the reference signal part and the control signal part separately. According to an embodiment, the reference signal part comprises reference signals that allow the UE to perform one or more of the following: cell search, synchronization, fine time/frequency tracking, radio resource management (RRM) measurements, radio link monitoring, and/or channel state information (CSI) reporting.

Figure 7B:
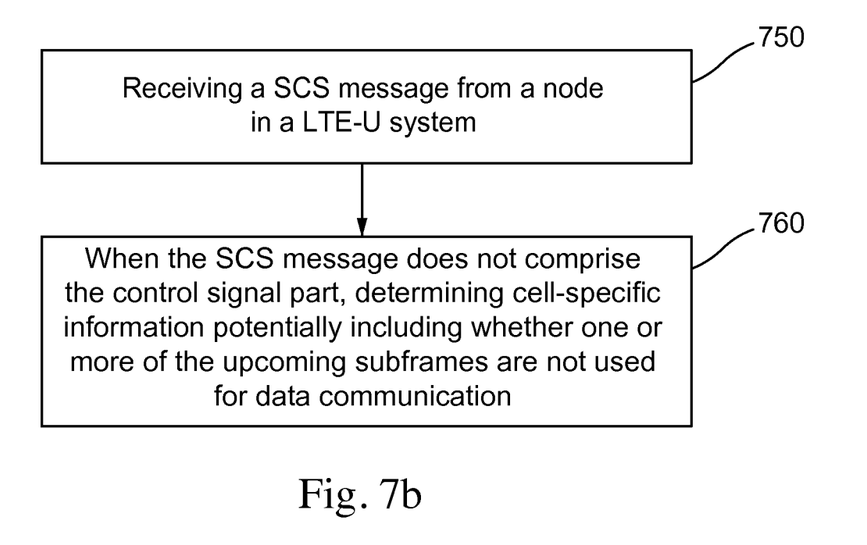
FIG. 7b illustrates a flow diagram of a method, according to another embodiment.

FIG. 7b illustrates an example of a flow diagram of a method, according to an embodiment. In one embodiment, the method may be performed by a UE, for example. The method includes, at 750, receiving a short control signaling (SCS) message from a base station, access point, or eNB in a LTE-U system, for example. The SCS message may comprise at least a reference signal part and an optional control signal part. In an embodiment, the receiving may comprise receiving the reference signal part and the control signal part separately. The reference signal part may comprise reference signals that allow the UE to perform, for instance, cell search, synchronization, fine time/frequency tracking, radio resource management (RRM) measurements, radio link monitoring, and/or channel state information (CSI) reporting. In one embodiment, at 760, when the SCS message does not comprise the control signal part, the method may include determining cell-specific information potentially including whether one or more of the upcoming subframes are not used for data communication.

In some embodiments, the functionality of any of the methods described herein, such as those illustrated in FIG. 7 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention provide several advantages. For example, some advantages include providing maximum commonality with current LTE solutions (discovery signal, eIMTA reconfiguration indicator, DCI framework, etc.). In addition, certain embodiments facilitate synchronous LTE-U operation compatible with regulatory rules defined by ETSI. Some embodiments also facilitate LTE-U cell discovery, RRM measurement and potentially CSI measurement opportunities with regulatory rules defined by ETSI. Furthermore, the control part is fairly flexible and can be applied to different use cases seen as beneficial in LTE-U operation. Additionally, embodiments cover at least both SDL and TDD operations.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
transmitting a short control signaling message from a network node to at least one user equipment,
wherein the short control signaling message comprises a reference signal part and a control signal part,
wherein the reference signal part comprises signals present in discovery signals including at least one of primary synchronization signal, secondary synchronization signal, cell-specific reference signal, or channel state information reference signals, and wherein said signals present in discovery signals allow the at least one user equipment to perform at least one of cell search, synchronization, fine time/frequency tracking, radio resource management measurements, radio link monitoring, or channel state information reporting, and
wherein the control signal part indicates at least one of: whether the cell is ON or OFF, whether each subframe in a current or upcoming set of subframes are ON or OFF, time division duplex uplink-downlink configuration for a current or upcoming radio frame, public land mobile network identifier to identify to which operator's network the cell belongs to, information by physical broadcast channel, or carrier domain-related information.

2. The method according to claim 1, wherein the transmitting comprises transmitting the short control signaling message with a periodicity of 5, 10, 15, 20, 40, 80, or 160 milliseconds.

3. The method according to claim 1, wherein the short control signaling has a maximum duty cycle of 5% within an observation period of 50 ms.

4. An apparatus, comprising:
at least one processor; and
at least one memory including computer program code, the at least one memory and computer program code configured, with the at least one processor, to cause the apparatus at least to
transmit, from the apparatus, a short control signaling message to at least one user equipment,
wherein the short control signaling message comprises a reference signal part and a control signal part, wherein the reference signal part comprises signals present in discovery signals including at least one of primary synchronization signal, secondary synchronization signal, cell-specific reference signal, or channel state information reference signals,
wherein said signals present in discovery signals allow the at least one user equipment to perform at least one of cell search, synchronization, fine time/frequency tracking, radio resource management measurements, radio link monitoring, or channel state information reporting, and
wherein the control signal part indicates at least one of: whether the cell is ON or OFF, whether each subframe in a current or upcoming set of subframes are ON or OFF, time division duplex uplink-downlink configuration for a current or upcoming radio frame, public land mobile network identifier to identify to which operator's network the cell belongs to, information by physical broadcast channel, or carrier domain-related information.

5. The apparatus according to claim 4, wherein the control signal part is transmitted in a same orthogonal frequency division multiplexing symbol(s) as also used by a portion of the reference signal part.

6. The apparatus according to claim 4, wherein the short control signaling message is transmitted with a periodicity of 5, 10, 15, 20, 40, 80, or 160 milliseconds.

7. The apparatus according to claim 4, wherein the short control signaling message is transmitted at a beginning of a channel reservation window.

8. The apparatus according to claim 4, wherein the at least one memory and the computer program code are further configured, with the at least one processor, to cause the apparatus at least to scramble a cyclic redundancy check of the control signal part with a radio network temporary identifier, and signal the radio network temporary identifier to the at least one user equipment via radio resource control signaling via a cell on which a clear channel assessment or listening-before-talk procedure is not used.

9. The apparatus according to claim 4, wherein the short control signaling message is transmitted in at least one of subframe #0 or subframe #5 of a radio frame.

10. The apparatus according to claim 4, wherein the short control signaling has a maximum duty cycle of 5% within an observation period of 50 ms.

11. A method, comprising:
receiving, by a user equipment, a short control signaling message from a network node, wherein the short control signaling message comprises a reference signal part and a control signal part,
wherein the reference signal part comprises signals present in discovery signals including at least one of primary synchronization signal, secondary synchronization signal, cell-specific reference signal, or channel state information reference signals,
wherein said signals present in discovery signals allow the user equipment to perform at least one of cell search, synchronization, fine time/frequency tracking, radio resource management measurements, radio link monitoring, or channel state information reporting, and
wherein the control signal part indicates at least one of: whether the cell is ON or OFF, whether each subframe in a current or upcoming set of subframes are ON or OFF, time division duplex uplink-downlink configuration for a current or upcoming radio frame, public land mobile network identifier to identify to which operator's network the cell belongs to, or information by physical broadcast channel, or carrier domain-related information.

12. The method according to claim 11, wherein the control signal part is received in a same orthogonal frequency division multiplexing symbol(s) as also used by receiving a portion of the reference signal part.

13. The method according to claim 11, wherein the receiving comprises receiving the short control signaling message with a periodicity of 5, 10, 15, 20, 40, 80, or 160 milliseconds.

14. The method according to claim 11, wherein the receiving comprises receiving the short control signaling message in at least one of subframe #0 or subframe #5 of a radio frame.

15. The method according to claim 11, wherein the short control signaling message is received without a clear channel assessment or listening-before-talk procedure.

16. The method according to claim 11, wherein the short control signaling message is received at a beginning of a channel reservation window.

17. The method according to claim 11, further comprising receiving the control signal part in physical downlink control channel format, and the control signal part comprises at least one downlink control information message.

18. The method according to claim 11, wherein the short control signaling has a maximum duty cycle of 5% within an observation period of 50 ms.

19. An apparatus, comprising:
at least one processor; and
at least one memory including computer program code, the at least one memory and computer program code configured, with the at least one processor, to cause the apparatus at least to
receive, at the apparatus, a short control signaling message from a network node,
wherein the short control signaling message comprises a reference signal part and a control signal part,
wherein the reference signal part comprises signals present in discovery signals including at least one of primary synchronization signal, secondary synchronization signal, cell-specific reference signal, or channel state information reference signals,
wherein said signals present in discovery signals allow the apparatus to perform at least one of cell search, synchronization, fine time/frequency tracking, radio resource management measurements, radio link monitoring, or channel state information reporting, and
wherein the control signal part indicates at least one of: whether the cell is ON or OFF, whether each subframe in a current or upcoming set of subframes are ON or OFF, time division duplex uplink-downlink configuration for a current or upcoming radio frame, public land mobile network identifier to identify to which operator's network the cell belongs to, information by physical broadcast channel, or system information.

20. The apparatus according to claim 19, wherein the short control signaling message is received without a clear channel assessment or listening-before-talk procedure.

21. The apparatus according to claim 19, wherein the control signal part is received in a same orthogonal frequency division multiplexing symbol(s) as also used by receiving a portion of the reference signal part.

22. The apparatus according to claim 19, wherein the at least one memory including computer program code, the at least one memory and computer program code configured, with the at least one processor, to further cause the apparatus at least to receive the short control signaling message with a periodicity of 5, 10, 15, 20, 40, 80, or 160 milliseconds.

23. The apparatus according to claim 19, wherein the at least one memory including computer program code, the at least one memory and computer program code configured, with the at least one processor, to further cause the apparatus at least to receive the short control signaling message in at least one of subframe #0 or subframe #5 of a radio frame.

24. The apparatus according to claim 19, wherein a cyclic redundancy check of the control signal part is scrambled with a radio network temporary identifier, and the radio network temporary identifier is received via radio resource control signaling via a cell on which a clear channel assessment or listening-before-talk procedure is not used.

25. The apparatus according to claim 19, wherein the short control signaling message is received at a beginning of a channel reservation window.

26. The apparatus according to claim 19, wherein the at least one memory including computer program code, the at least one memory and computer program code configured, with the at least one processor, to further cause the apparatus at least to receive the control signal part in physical downlink control channel format, and the control signal part comprises at least one downlink control information message.

27. The apparatus according to claim 19, wherein a cyclic redundancy check of the control signal part is scrambled with a radio network temporary identifier, and the radio network temporary identifier is received via radio resource control signaling via a cell on which a clear channel assessment or listening-before-talk procedure is not used.

28. The apparatus according to claim 19, wherein the at least one memory and computer program code are configured, with the at least one processor, to cause the apparatus at least to further determine cell-specific information including whether one or more of the upcoming subframes are not used for data communication.

29. The apparatus according to claim 19, wherein the short control signaling has a maximum duty cycle of 5% within an observation period of 50 ms.

* * * * *